United States Patent
Sheng et al.

(10) Patent No.: US 11,516,079 B1
(45) Date of Patent: Nov. 29, 2022

(54) NETWORK INITIALIZATION COMMUNICATION STORAGE SYSTEM

(71) Applicant: Dell Products L.P., Round Rock, TX (US)

(72) Inventors: Yu Cheng Sheng, Taoyuan (TW); Yu Hsuan Yang, Taoyuan (TW); Chih Chao Liu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/511,700

(22) Filed: Oct. 27, 2021

(51) Int. Cl.
| | |
|---|---|
| *H04L 41/0806* | (2022.01) |
| *H04L 41/08* | (2022.01) |
| *H04L 67/02* | (2022.01) |
| *H04L 67/1097* | (2022.01) |
| *H04L 41/0869* | (2022.01) |

(52) U.S. Cl.
CPC ...... *H04L 41/0806* (2013.01); *H04L 41/0869* (2013.01); *H04L 41/0886* (2013.01); *H04L 67/02* (2013.01); *H04L 67/1097* (2013.01)

(58) Field of Classification Search
CPC ............. H04L 41/0806; H04L 41/0869; H04L 41/0886; H04L 67/02; H04L 67/1097
See application file for complete search history.

(56) References Cited

U.S. PATENT DOCUMENTS

| | | | |
|---|---|---|---|
| 7,398,382 B2 | 7/2008 | Rothman et al. | |
| 7,848,334 B2 * | 12/2010 | Guillemot | H04L 12/66 370/428 |
| 8,286,231 B2 * | 10/2012 | Arnold | H04L 63/105 726/13 |
| 2009/0153364 A1 * | 6/2009 | Buchalo | G08G 1/0104 340/993 |
| 2018/0046832 A1 * | 2/2018 | Lee | G06F 3/0632 |
| 2018/0210783 A1 * | 7/2018 | Sasahara | G06F 9/4411 |

(Continued)

FOREIGN PATENT DOCUMENTS

| | | | | |
|---|---|---|---|---|
| CN | 101473638 B | * | 9/2013 | ....... H04L 29/06027 |
| CN | 113242150 A | * | 8/2021 | |

(Continued)

*Primary Examiner* — Shean Tokuta
(74) *Attorney, Agent, or Firm* — Joseph Mencher

(57) ABSTRACT

A network initialization communication storage system includes a host device coupled to a storage system and an initialization issue analysis system via a network. The host device includes an initialization subsystem coupled to each of a plurality of ports. During network initialization of the host device via the storage system, the initialization subsystem identifies network initialization communications transmitted via the port(s) and the network, filters the network initialization communications to remove a subset of network initialization information and provide filtered network initialization communications, and transmits the filtered network initialization communications for storage in a remote access controller subsystem in the host device. In the event the network initialization of the host device fails, the initialization issue analysis system retrieves the filtered network initialization communications from the remote access controller subsystem, and uses them to identify at least one issue with the network initialization of the host device via the storage system.

20 Claims, 11 Drawing Sheets

(56) References Cited

U.S. PATENT DOCUMENTS

| | | | |
|---|---|---|---|
| 2019/0319863 A1* | 10/2019 | Gupta | H04W 24/04 |
| 2020/0366633 A1* | 11/2020 | Suarez | H04L 63/10 |
| 2022/0006746 A1* | 1/2022 | Martin | H04L 47/24 |
| 2022/0166736 A1* | 5/2022 | Freed | H04L 51/212 |

FOREIGN PATENT DOCUMENTS

| | | | | |
|---|---|---|---|---|
| CN | 113903447 A * | 1/2022 | | H04L 43/062 |
| DE | 60301767 T2 * | 6/2006 | | G10L 17/12 |
| EP | 3541020 A1 * | 9/2019 | | H04L 43/028 |
| JP | 2002135359 A * | 5/2002 | | H04L 41/064 |
| JP | 3816748 B2 * | 8/2006 | | H04L 43/50 |
| WO | WO-2019176387 A1 * | 9/2019 | | G05B 19/4185 |
| WO | WO-2020224192 A1 * | 11/2020 | | A01M 1/2022 |

* cited by examiner

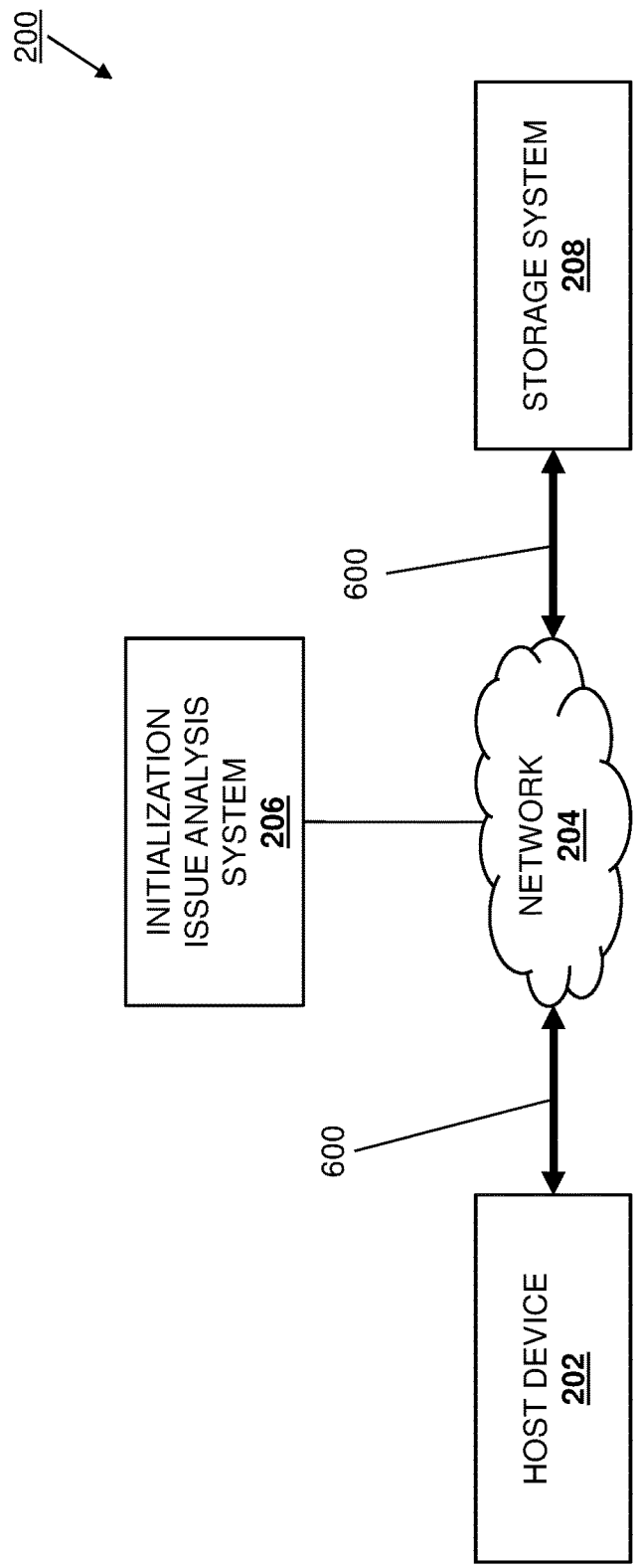

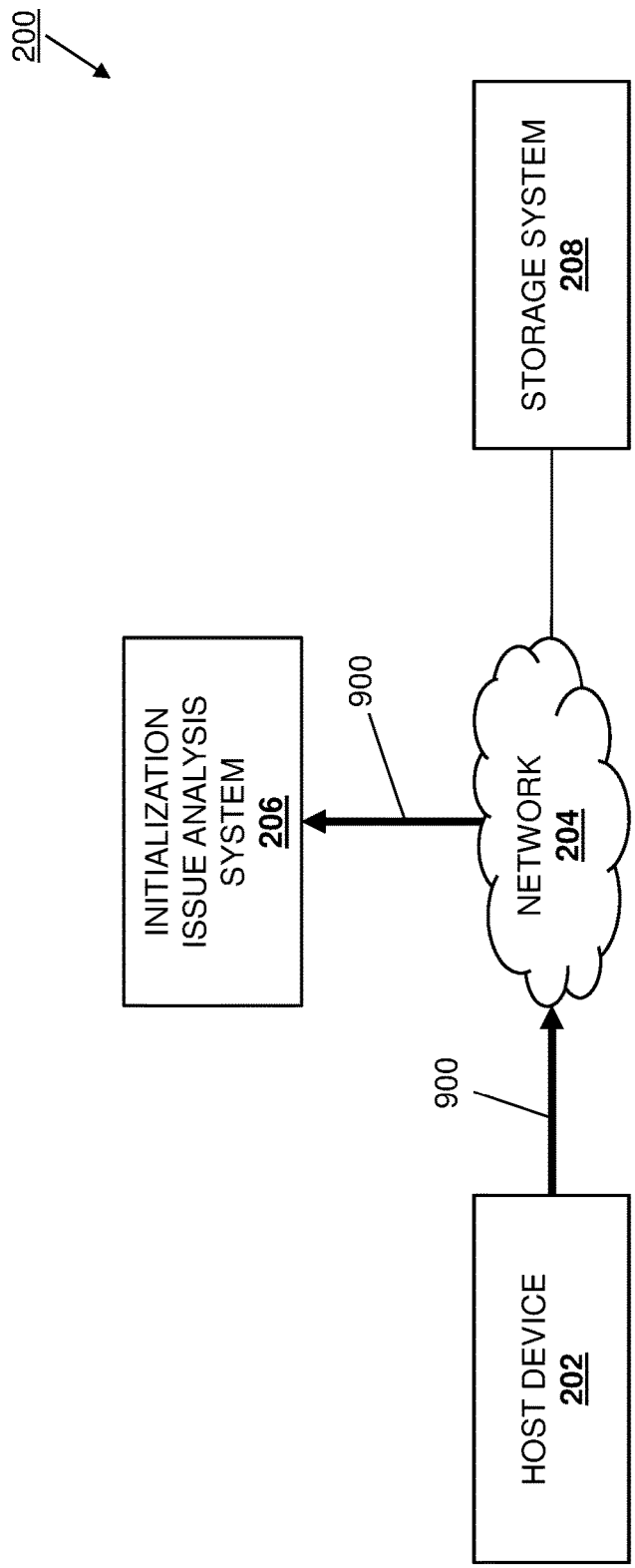

NETWORK INITIALIZATION COMMUNICATION STORAGE SYSTEM

BACKGROUND

The present disclosure relates generally to information handling systems, and more particularly to storing network initialization communications associated with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other host devices known in the art, have begun to initialize via networks. For example, storage systems such as Non-Volatile Memory express over Fabrics (NVMe-oF) storage systems, HyperText Transfer Protocol (HTTP)/HTTP Secure (HTTPS) storage systems, Internet Small Computer Systems Interface (ISCSI) storage systems, Pre-eXecution Environment (PXE) storage systems, and/or other network initialization storage system known in the art, may be provided with initialization information (e.g., an operating system and other information used by host devices for initialization), and host devices may retrieve that initialization information from the network initialization storage system and use that initialization information to start up, boot, and/or otherwise initialize (e.g., load an operating system and enter a runtime state in which the operating system controls the host device). However, initialization via network initialization storage systems raises some issues.

For example, the network initialization discussed may be performed by the host device using the Transmission Control Protocol (TCP), and initialization via an network initialization storage system using TCP involves complex network initialization functionality that utilizes storage subsystems, discovery controllers, routers, Dynamic Host Configuration Protocol (DHCP) subsystems, Domain Name System (DNS) subsystems, and/or other subsystems known in the art. For example, subsequent to a host device powering on, a Basic Input/Output System (BIOS)/Uniform Extensible Firmware Interface (UEFI) may perform increasingly complex network communications with the network initialization storage system including TCP connection establishment communications (e.g., network initialization with a Universal Network Device Interface (UNDI) and/or other relatively low-level protocols), DHCP server communications (e.g., to retrieve an IP address for the network initialization storage system), DNS server communications (e.g., to retrieve a domain for the network initialization storage system), TCP communications with the network initialization storage system (e.g., to exchange initialization information, identify a boot partition, identify an operating system, load an operating system, etc.), and/or other network communications that one of skill in the art in possession of the present disclosure would recognize as being performed during network initialization.

As will be appreciated by one of skill in the art in possession of the present disclosure, the network initialization discussed above may fail due to issues with the network communications such as, for example, inability to communicate with a DCHP server, inability to communicate with a DNS server, inability to establish a TCP connection, data transfer errors, security issues (e.g., certificate or key issues with Transport Layer Security (TLS), handshake issues, security protocol issues, host device permission issues related to the network initialization storage system, host device namespace issues related to the network initialization storage system, etc.), and/or other network communication issues known in the art. In response to networking initialization failure, conventional network initialization systems will typically have the host device display an error message to the network administrator or other user, and may retry the network initialization (e.g., sometimes using the same initialization/boot option, sometimes using a new/subsequent/next initialization/boot option) to see if the network initialization issue persists. In the event the network initialization issue persists, the network administrator or other user must guess what caused the network initialization issue and then modify the host device and/or network initialization storage system based on that guess in an attempt to remedy the network initialization issue that led to the network initialization failure, which can be time-consuming and results in downtime for the host device.

Accordingly, it would be desirable to provide a network initialization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an initialization engine that is configured, during network initialization of an Information Handling System (IHS) via a storage system, to: identify network initialization communications that are transmitted via a network and at least one of a plurality of ports that are coupled to the processing system; filter the network initialization communications to remove a subset of network initialization information from the network initialization communications to provide filtered network initialization communications; and transmit the filtered network initialization communications for storage in a remote access controller device that is coupled to the processing system.

BRIEF DESCRIPTION OF THE DRAWINGS

FIG. 6A is a schematic view illustrating an embodiment of the networked system of FIG. 2 operating during the method of FIG. 4.

FIG. 9B is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
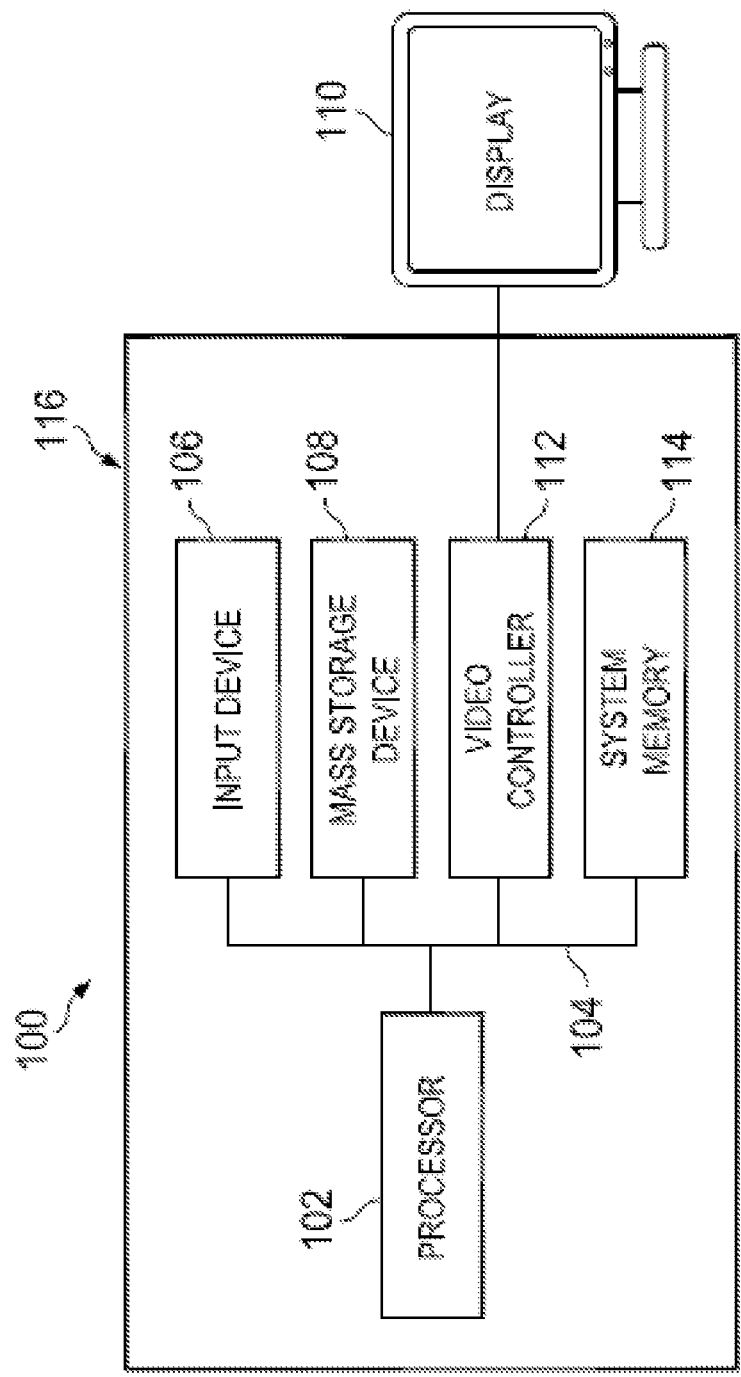
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
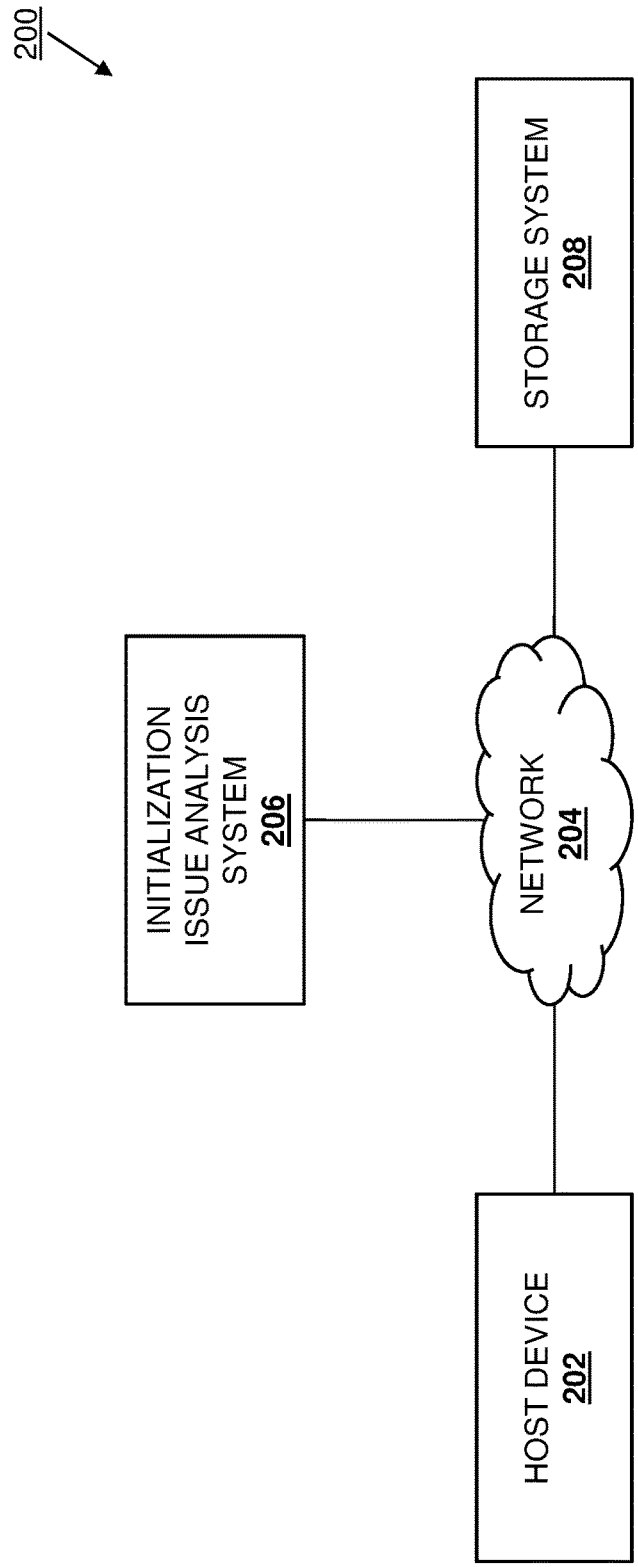
FIG. 2 is a schematic view illustrating an embodiment of a networked system that may include the network initialization communication storage system of the present disclosure.

Referring now to FIG. 2, an embodiment of a networked system 200 is illustrated. In the illustrated embodiment, the networked system 200 includes a host device 202. In an embodiment, the host device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that host devices provided in the networked system 200 may include any devices that may be configured to operate similarly as the host device 202 discussed below. In the illustrated embodiment, the host device 202 is coupled to a network 204 that may be provided by a Local Area Network (LAN), the Internet, combinations thereof, and/or any of a variety of other networks that would be apparent to one of skill in the art in possession of the present disclosure.

In the illustrated embodiment, the networked system 200 also includes an initialization issue analysis system 206 that is coupled to the network 204 as well. In an embodiment, the initialization issue analysis system 206 may be provided by the IHS 100 discussed above with reference to FIG. 1, and/or may include some or all of the components of the IHS 100, and in specific examples may be provide by one or more server devices, a desktop computing device, a laptop/notebook computing device, a tablet computing device, a phone, and/or other monitoring systems that would be apparent to one of skill in the art in possession of the present disclosure. However, while illustrated and discussed as being provided by particular devices, one of skill in the art in possession of the present disclosure will recognize that initialization issue analysis systems provided in the networked system 200 may include any devices that may be configured to operate similarly as the initialization issue analysis system 206 discussed below.

In the illustrated embodiment, the networked system 200 also includes a storage system 208 that is coupled to the network 204 as well. In an embodiment, the storage system 208 may be provided by the IHS 100 discussed above with reference to FIG. 1, and/or may include some or all of the components of the IHS 100, and in specific examples may be provided by a Non-Volatile Memory express over Fabrics (NVMe-oF) storage system, a HyperText Transfer Protocol (HTTP)/HTTP Secure (HTTPS) storage system, an Internet Small Computer Systems Interface (ISCSI) storage system, a Pre-eXecution Environment (PXE) storage system, and/or other network-connected storage systems that one of skill in the art in possession of the present disclosure would recognize as being capable of storing initialization information for the host device 202 (e.g., operating system and/or other initialization information used by host devices). However, while illustrated and discussed as being provided by particular storage systems, one of skill in the art in possession of the present disclosure will recognize that storage systems provided in the networked system 200 may include any devices that may be configured to operate similarly as the storage system 208 discussed below. As such, while a specific networked system 200 has been illustrated and described, one of skill in the art in possession of the present disclosure will recognize that the network initialization communication storage system of the present disclosure may include a variety of components and component configurations while remaining within the scope of the present disclosure as well.

Figure 3:
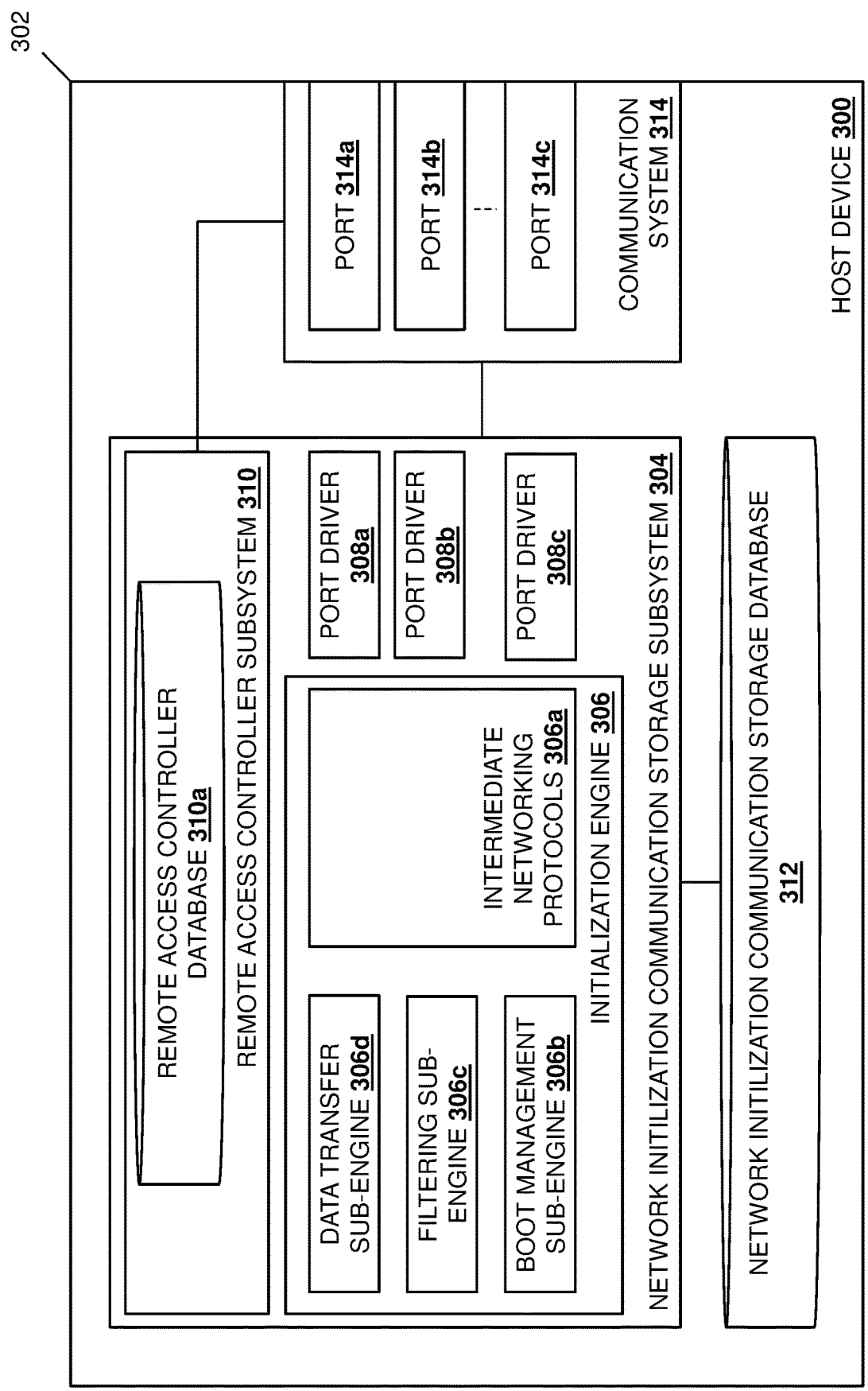
FIG. 3 is a schematic view illustrating an embodiment of a host device that may be included in the networked system of FIG. 2 and that may provide the network initialization communication storage system of the present disclosure.

Referring now to FIG. 3, an embodiment of a host device 300 is illustrated that may provide the host device 202 discussed above with reference to FIG. 2. As such, the host device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the host device 300 discussed below may be provided by other devices that are configured to operate similarly as the host device 300 discussed below. In the illustrated embodiment, the host device 300 includes a chassis 302 that houses the components of the host device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an network initialization communication storage subsystem 304 that is configured to perform the functionality of the network initialization communication storage subsystems and/or host devices discussed below.

In the specific examples provided herein, the network initialization communication storage subsystem 304 may include an initialization engine 306 that may be provided by a Basic Input/Output System (BIOS) and/or Unified Extensible Firmware Interface (UEFI) that is included in the host device 300 and that one of skill in the art in possession of the present disclosure will recognize operates to perform initialization operations for the host device 300 during its startup, boot, or other initialization, as well as a variety of BIOS/UEFI runtime operations known in the art. As will be appreciated by one of skill in the art in possession of the present disclosure, the network initialization communication storage subsystem 304 and the initialization engine 306 are illustrated as including components that may actually be loaded or otherwise provided during initialization of the host device 300. For example, the initialization engine 306 is illustrated as including intermediate networking protocols 306a that may utilized by drivers provided in a BIOS/UEFI network stack, by drivers provided in an application layer, and/or any by any other subsystem that would be apparent to one of skill in the art in possession of the present disclosure.

In a specific example, the drivers provided in the BIOS/UEFI network stack that utilize the intermediate networking protocols 306a of the initialization engine 306 may include Address Resolution Protocol (ARP) drivers, Dynamic Host Configuration Protocol (DHCP) (e.g., DHCP version 6 (DHCPv6)) drivers, Internet Protocol (IP) (e.g., IP version 6 (IPv6)) drivers, Transmission Control Protocol (TCP) drivers, User Datagram Protocol (UDP) drivers, HyperText Transfer Protocol (HTTP) (e.g., HTTP Secure (HTTPS)) drivers, Transport Layer Security (TLS) drivers, and/or any other BIOS/UEFI network stack drivers that would be apparent to one of skill in the art in possession of the present disclosure. In another specific example, the drivers provided in the application layer that utilize the intermediate networking protocols 306a of the initialization engine 306 may include NVMe-oF initialization drivers, HTTP (e.g., HTTPS) initialization drivers, ISCSI initialization drivers, PXE drivers, and/or any other application layer drivers that would be apparent to one of skill in the art in possession of the present disclosure. However, while a few specific examples are provided, one of skill in the art in possession of the present disclosure will appreciate that other intermediate networking protocols (e.g., the Simple Network Protocol (SNP)) may be included in the intermediate networking protocols 306a while remaining within the scope of the present disclosure as well.

In addition, the initialization engine 306 is also illustrated as including a boot management sub-engine 306b that may be provided by a BIOS/UEFI boot manager, a filtering sub-engine 306c that may include a filtering driver and may store or have access to one or more filters (e.g., one or more filtering rules used in the network initialization communication filtering operations discussed below), and a data transfer sub-engine 306d that is configured to perform data transfers from the initialization engine 306 to the remote access controller database 308a that is discussed in further detail below. In a specific example, the data transfer sub-engine 306d may be provided by "DellTelemetryLib" BIOS/UEFI functionality that is included in BIOS/UEFI provided by DELL® Inc. of Round Rock, Tex., United States, which one of skill in the art will recognize that an abstraction layer for the BIOS/UEFI that allows debug messages generated by the BIOS/UEFI to be stored in an integrated Remote Access Controller (iDRAC) included with those BIOS/UEFI in server devices and other computing systems provided by DELL® Inc. of Round Rock, Tex., United States. As will be recognized by one of skill in the art in possession of the present disclosure, BIOS/UEFI functionality like the "DellTelemetryLib" BIOS/UEFI functionality discussed above may provide for storage of the debug messages discussed above without the need for the BIOS/UEFI to be aware of their storage location in the iDRAC. However, while a specific data transfer sub-engine is described, one of skill in the art in possession of the present disclosure will appreciate how other data transfer sub-engines will fall within the scope of the present disclosure as well.

The network initialization communication storage subsystem 304 is also illustrated as including port drivers 308a, 308b, and up to 308c for each port utilized during network initialization (discussed in further detail below), and one of skill in the art in possession of the present disclosure will appreciate how the port drivers 314a-314c may be provided by communication system drivers. In a specific example, the port drivers 314a-314c may be Network Interface Controller (NIC) device drivers that may utilize the Network Interface Identifier (NII) protocol defined in the UEFI specification, may include Universal Network Device Interfaces (UNDIs)

provided according to UNDI standards used by BIOS or UEFI, may each be provided with separate instances of the SNP discussed above, and/or may include or utilize other protocols/interfaces that are provided outside the initialization engine 306 (e.g., outside the BIOS or UEFI). As discussed above, one of skill in the art in possession of the present disclosure will appreciate how the network initialization communication storage subsystem 304 and the initialization engine 306 may be configured as part of the initialization of the host device 300 to install, load, and/or otherwise provide the components of the network initialization communication forwarding subsystem 304 and the initialization engine 306 illustrated in FIG. 3 and/or discussed above (e.g., the engines, protocols, drivers, etc.).

The network initialization communication storage subsystem 304 may also include a remote access controller subsystem 310 that may be provided by an iDRAC included in server devices and other computing devices provided by DELL® Inc. of Round Rock, Tex., United States, a Baseboard Management Controller (BMC), and/or other remote access controller subsystems that would be apparent to one of skill in the art in possession of the present disclosure. In the illustrated embodiment, the remote access controller subsystem 310 includes a remote access controller storage device (not illustrated) which provides a remote access controller database 310a. In a specific example, the remote access controller database may be configured to store a Technical Support Log (TLS) utilized in the iDRAC discussed above, although other remote access controller storage locations and/or storage structures are envisioned as falling within the scope of the present disclosure as well.

As will be appreciated by one of skill in the art in possession of the present disclosure, the remote access controller subsystem 310 may operate independently of the rest of the host device 300. For example, the remote access controller subsystem 310 may include a remote access controller processing system and remote access controller memory system that includes instructions that, when executed by the remote access controller processing system, cause the remote access controller processing system to provide a remote access controller engine that performs the functionality of the remote access controller engine and/or remote access controller subsystems discussed below. In particular, the remote access controller processing system and remote access controller memory system may be separate from an initialization processing system and initialization memory system that provide the initialization engine 306 (e.g., the BIOS/UEFI discussed herein), with the remote access controller subsystem 310 including power and communications capabilities that are separate from the initialization engine 306 such that the remote access controller subsystem 310 may operate when the initialization engine 306 cannot (e.g., due to lack of power, communication component failures, initialization processing/memory system failures, etc.)

The chassis 302 may also house a storage system (not illustrated, but which may include the storage 108 discussed above with reference to FIG. 1) that is coupled to the network initialization communication storage engine 304 (e.g., via a coupling between the storage system and the processing system) and that includes an network initialization communication storage database 312 that is configured to store any of the information utilized by the network initialization communication storage engine 304 discussed below. The chassis 302 may also house a communication system 314 that is coupled to the network initialization communication storage engine 304 (e.g., via a coupling between the communication system 314 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. In the illustrated example, the communication system 314 includes a plurality of ports 314a, 314b, and up to 314c, each of which may be provided by Ethernet ports and/or any of a variety of other ports known in the art. However, while a specific host device 300 has been illustrated and described, one of skill in the art in possession of the present disclosure will recognize that host devices (or other devices operating according to the teachings of the present disclosure in a manner similar to that described below for the host device 300) may include a variety of components and/or component configurations for providing conventional host device functionality, as well as the functionality discussed below, while remaining within the scope of the present disclosure as well.

Figure 4:
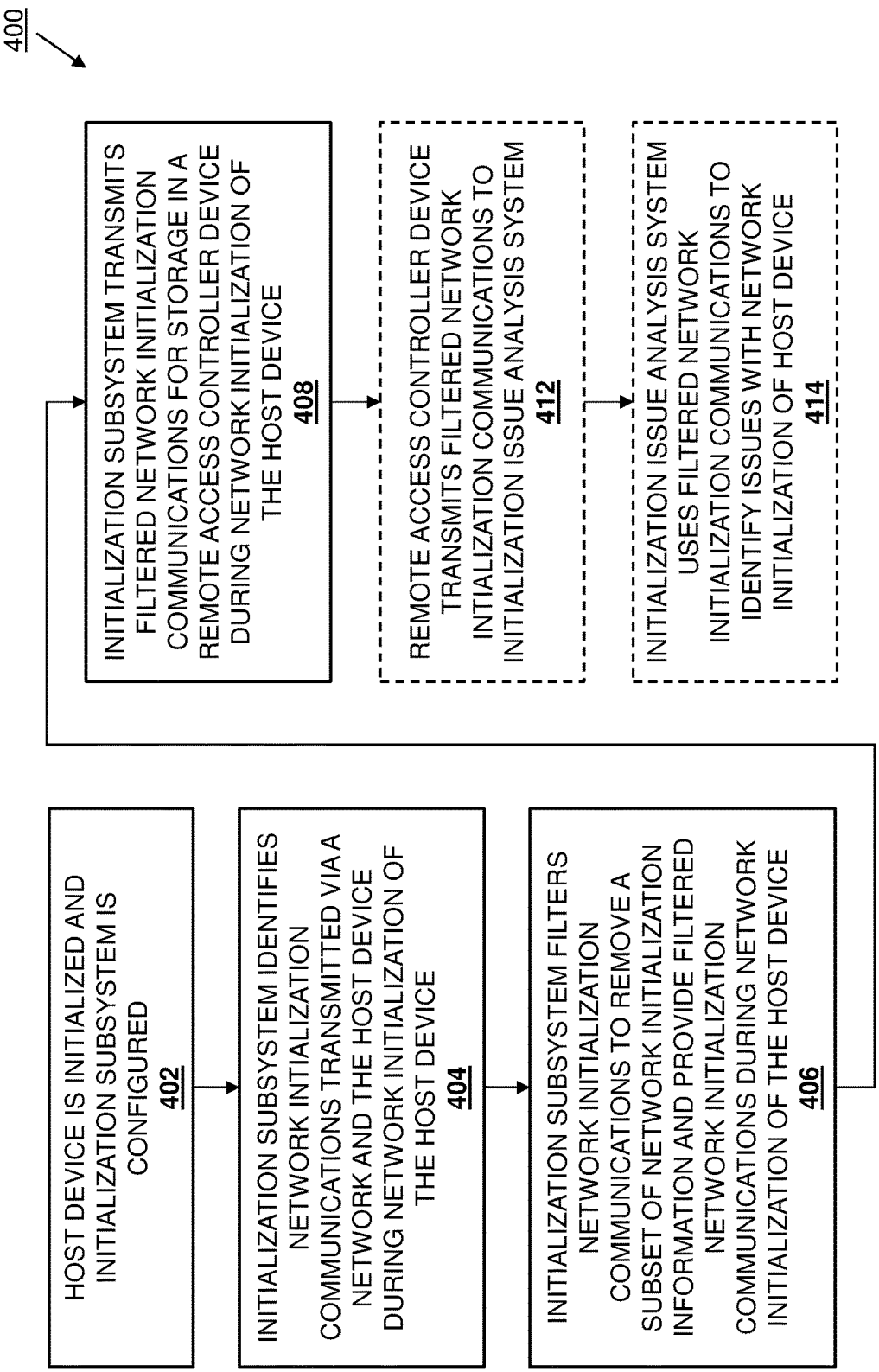
FIG. 4 is a flow chart illustrating an embodiment of a method for storing network initialization communications.

Referring now to FIG. 4, an embodiment of a method 400 for storing network initialization communications is illustrated. As discussed below, the systems and methods of the present disclosure provide for the local storage of filtered initialization communications generated by a host device during network initialization in a remote access controller device, which allows those filtered initialization communications to be retrieved from the remote access controller device and analyzed in the event of a network initialization failure with the host device. For example, a network initialization monitoring system may include a host device coupled to a storage system and an initialization issue analysis system via a network. The host device includes an initialization subsystem coupled to each of a plurality of ports. During network initialization of the host device via the storage system, the initialization subsystem identifies network initialization communications transmitted via the port(s) and the network, filters the network initialization communications to remove a subset of network initialization information and provide filtered network initialization communications, and transmits the filtered network initialization communications for storage in a remote access controller subsystem in the host device. In the event the network initialization of the host device fails, the initialization issue analysis system retrieves the filtered network initialization communications from the remote access controller subsystem, and uses them to identify at least one issue with the network initialization of the host device via the storage system. As such, some embodiments of the present disclosure may provide for "always-on" filtered network initialization communication recording at the host device that may subsequently be leveraged to identify network initialization issues, which eliminates security concerns with conventional systems that have switches or other networking devices coupled to a host device capture all of the network communications by that host device in order to analyze network communication issues with that host device.

The method 400 begins at block 402 where a host device is initialized and an initialization subsystem is configured. In an embodiment, at block 402, the host device 202/300 may be powered on, started up, reset, and/or otherwise initialized such that an initialization process (e.g., a Power On Self-Test (POST) process) for the host device 202/300 begins and an initialization subsystem in the host device 202/300 is configured. As will be appreciated by one of skill in the art in possession of the present disclosure, the initialization process for the host device 202/300 may last throughout the method 400 until it either completes successfully and the host device 202/300 enters a runtime state, or it fails such that the host device 202/300 is unable to enter the runtime state. As discussed above, the configuration of the initialization subsystem in the host device 300 may include the network initialization communication storage engine 304 and/or the initialization engine 306 loading or otherwise providing the intermediate networking protocols 308 in the initialization engine 306; loading or otherwise providing the boot management sub-engine 306b, the filtering sub-engine 306c, and the data transfer sub-engine 306d in the initialization engine 306; loading or otherwise providing the port drivers 308a, 308b, and up to 308c in the network initialization communication storage engine 304 for each of the ports 318a, 318b, and up to 318c, respectively, and/or configuring the network initialization communication storage engine 304 and the initialization engine 306 in any other manner that one of skill in the art in possession of the present disclosure would recognize as providing for the functionality discussed below.

In different embodiments, the network initialization communication storage engine 304 and/or the initialization engine 306 loading or otherwise providing the intermediate networking protocols 308 in the initialization engine 306 at block 402 may be performed in a variety of manners that will fall within the scope of the present disclosure. For example, the network initialization communication forwarding engine 304 and/or the initialization engine 306 may load or otherwise provide conventional drivers (e.g., the drivers in the BIOS/UEFI network stack and the drivers in the application layer that utilize the intermediate networking protocols 306a of the initialization engine 306 as discussed above), and may then subsequent modify those conventional drivers to perform the network initialization communication copying and copy forwarding operations as discussed below. However, in another example, the network initialization communication forwarding engine 304 and/or the initialization engine 306 may load or otherwise provide drivers (e.g., the drivers in the BIOS/UEFI network stack and the drivers in the application layer that utilize the intermediate networking protocols 306a of the initialization engine 306 as discussed above) that are already configured to perform the network initialization communication copying and copy forwarding operations as discussed below (e.g., the drivers in the BIOS/UEFI network stack and the drivers in the application layer that utilize the intermediate networking protocols 306a of the initialization engine 306 may be "owned" by the provider of the host device 202/300, and thus the network initialization communication copying and forwarding functionality described below may be integrated into those drivers rather than provided for those drivers during initialization of the host device 202/300).

Figure 5:
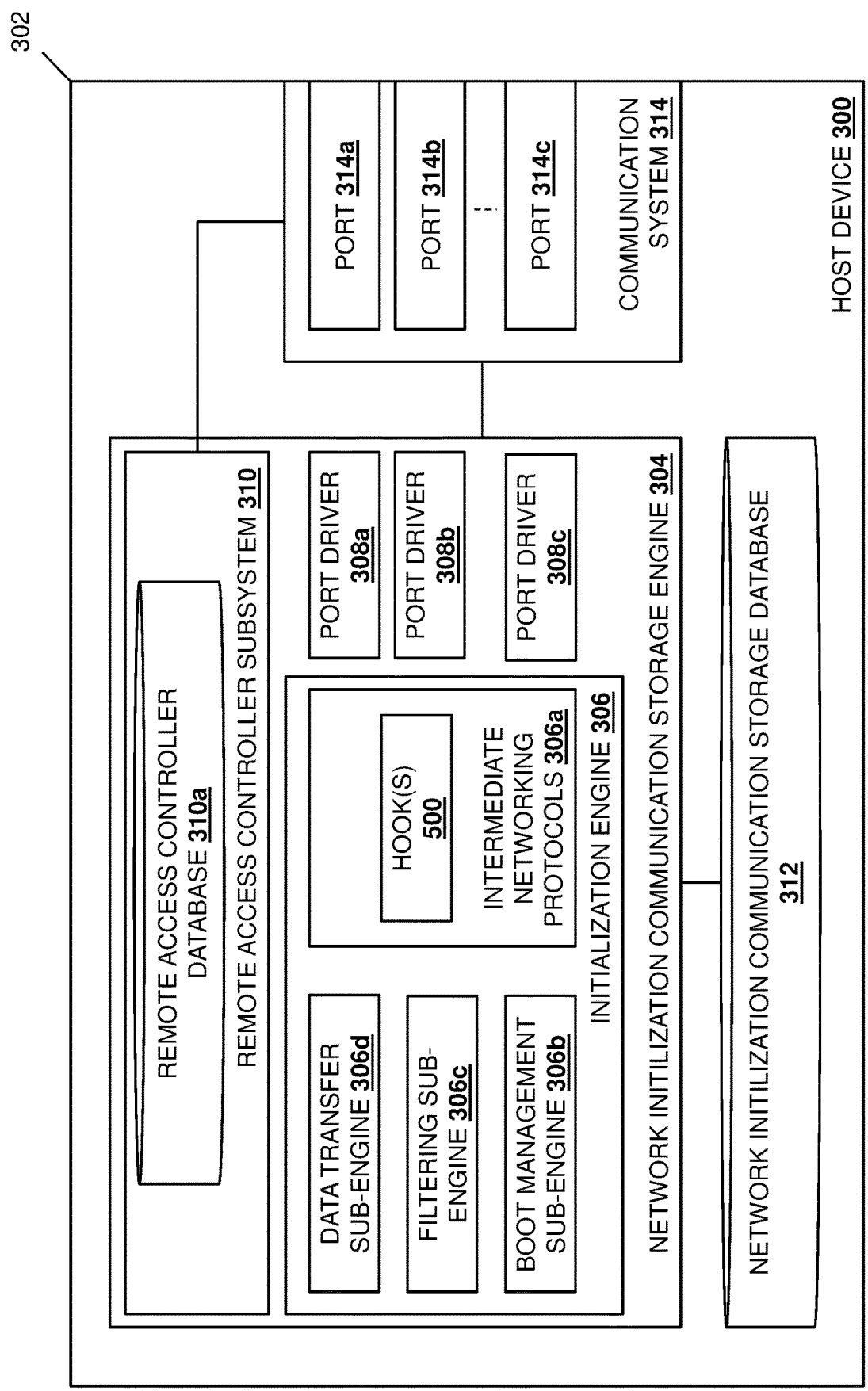
FIG. 5 is a schematic view illustrating an embodiment of the host device of FIG. 3 operating during the method of FIG. 4.

In the specific embodiment illustrated in FIG. 5, the configuration of the initialization subsystem at block 402 may also include the network initialization communication forwarding engine 304 and/or the initialization engine 306 (e.g., a hook installation driver loaded or otherwise provided in the network initialization communication forwarding engine 304 and/or the initialization engine 306) performing hook provisioning operations that may include providing hooks(s) 500 in conventional drivers (e.g., the drivers in the BIOS/UEFI network stack and the drivers in the application layer that utilize the intermediate networking protocols 306a of the initialization engine 306 as discussed above) that cause those drivers to perform the functionality described below. As will be appreciate by one of skill in the art in possession of the present disclosure, the "hooks" described herein may include any code, instructions, and/or other programming elements that are configured to modify the operation of a conventional driver to cause that driver to perform the network initialization communication copying and copy forwarding operations discussed below, while still allowing that driver to also perform its conventional operations as well.

However, while the network initialization communication forwarding engine 304 and/or the initialization engine 306 are described as providing a respective hook in the conventional drivers that utilize the intermediate networking protocols 306a in the initialization engine 306, as discussed above the drivers that utilize the intermediate networking protocols 306a in the initialization engine 306 may be configured to perform the network initialization communication copying and copy forwarding operations discussed below without the need for the hook installation described above. In other words, the drivers that utilize the intermediate networking protocols 306a in the initialization engine 306 in the present disclosure may include code or instructions that perform the network initialization communication copying and copy forwarding operations discussed below, and thus the provisioning of the drivers that utilize the intermediate networking protocols 306a in the initialization engine 306 during block 402 may allow that functionality without the need to provide the hook(s) 500 illustrated and described in the examples provided herein during the initialization of the host device 202/300.

The method 400 then proceeds to block 404 where the initialization subsystem identifies network initialization communications transmitted via a network and the host device during network initialization of the host device. While the example below discusses the filtering and storage of network initialization communications transmitted via the port 314a on the host device 202/300 and the network 204, one of skill in the art in possession of the present disclosure will recognize that similar filtering and storage of network initialization communications transmitted via the ports 314b and/or up to 314c on the host device 202/300 and the network 204 will fall within the scope of the present disclosure as well. As such, all network initialization communications transmitted as part of any particular initialization of the host device 202/300 via any of its ports 314a-314c may be filtered and stored during the method 400 similarly as described for the port 314a below.

Figure 6B:
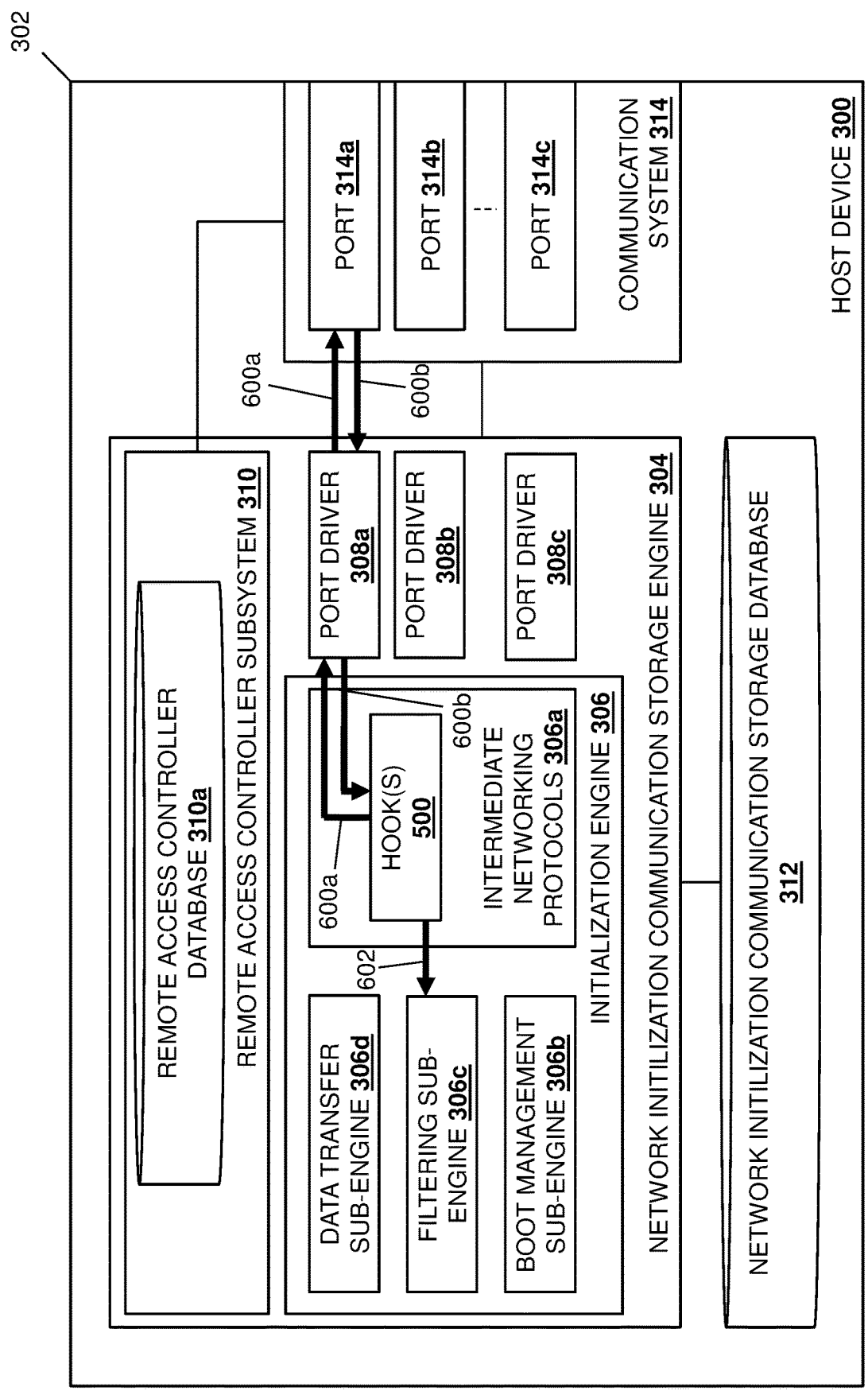
FIG. 6B is a schematic view illustrating an embodiment of the host device of FIG. 3 operating during the method of FIG. 4.
Figure 7:
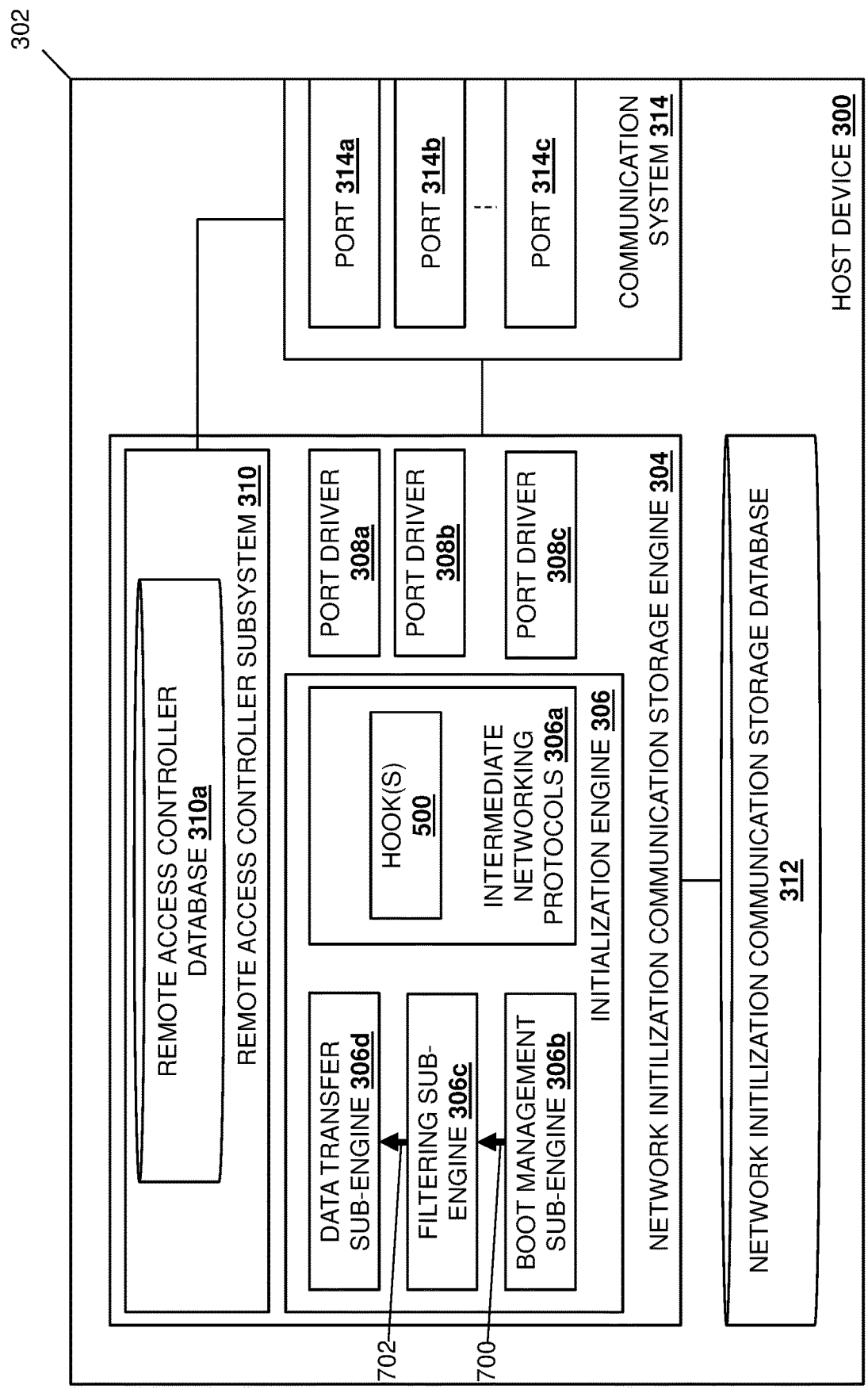
FIG. 7 is a schematic view illustrating an embodiment of the host device of FIG. 3 operating during the method of FIG. 4.

With reference to FIG. 6A, in an embodiment of block 404, the host device 202/300 may perform network initialization communication transmission operations 600 that include transmitting initialization communications via the network 204 with the storage system 208. For example, FIG. 6B illustrates how the network initialization communication transmission operations 600 may include network initialization communication sending operations 600a that send network initialization communications using the intermediate networking protocols 306a, the port driver 308a provided for the port 314a, and the port 314a, and through the network 204 to the storage system 208. FIG. 6B also illustrates how the network initialization communication transmission operations 600 may include network initialization communication receiving operations 600b that receive network initialization communications through the network 204 from the storage system 208 using the port 314a, the port driver 308a provided for the port 314a, and the intermediate networking protocols 306a.

In a specific examples, the network initialization communication transmission operations 600 may include TCP connection establishment communications (e.g., network initialization with a Universal Network Device Interface (UNDI) and/or other relatively low-level protocols), DHCP server communications (e.g., to retrieve an IP address or the NVMe-oF storage system), DNS server communications (e.g., to retrieve a domain for the NVMe-oF storage system), TCP communications with the NVMe-oF storage system (e.g., to exchange initialization information, identify a boot partition, identify an operating system, load an operating system, etc.), and/or other network communications that one of skill in the art in possession of the present disclosure would recognize as being performed during network initialization. As such, the network initialization communication transmission operations 600 may include a plurality of incoming and outgoing network packets transmitted via the port 314a.

With reference to FIG. 6B, at block 404 the drivers (e.g., the drivers in the BIOS/UEFI network stack and the drivers in the application layer that utilize the intermediate networking protocols 306a of the initialization engine 306 as discussed above) may perform network initialization communication copying/forwarding operations 602 that include copying any network initialization communications sent or received via the port 314a as part of the network initialization communication transmission operations 600, and forwarding those copies of the network initialization communications to the filtering sub-engine 306c. For example, the boot management sub-engine 206b in the initialization engine 306 may operate to start the network initialization communication copying and copy forwarding operations along with the initialization of the host device 202/300 (and may later stop those operations as discussed below). As such, the "identification" of the network initialization communications at block 404 may refer to the receiving of the copies of the network initialization communications by the filtering sub-engine 306c from the drivers discussed above, although one of skill in the art in possession of the present disclosure will appreciate "identification" of the network initialization communications at block 404 may refer to the receiving of the network initialization communications by other components in the host device 202/300 while remaining within the scope of the present disclosure as well.

As discussed above, in some embodiments, the hook(s) 500 in each of the drivers (e.g., each of the drivers in the BIOS/UEFI network stack and the drivers in the application layer that utilize the intermediate networking protocols 306a of the initialization engine 306 as discussed above) may perform the network initialization communication copying/forwarding operations 602. However, as also discussed above, in other embodiments the drivers (e.g., the drivers in the BIOS/UEFI network stack and the drivers in the application layer that utilize the intermediate networking protocols 306a of the initialization engine 306 as discussed above) may be configured to perform the network initialization communication copying/forwarding operations 602 without the need for installation of the hook(s) 500 during the initialization of the host device 300 as discussed above.

The method 400 then proceeds to block 406 where the initialization subsystem filters the network initialization communications to remove a subset of network initialization information and provide filtered network initialization communications during the network initialization of the host device. In an embodiment, at block 406, the filtering sub-engine 306c may perform filtering operation in order to remove a subset of network initialization information from the cop(ies) of the network initialization communications received at block 404 in order to generate filtered network initialization communications. As will be appreciated by one of skill in the art in possession of the present disclosure, the filtering sub-engine 306c may include or have access to filter(s) (e.g., one or more filtering rules) that may operate to filter out subsets of the network initialization information included in the copies of the network initialization communications to generate the filtered network initialization communications that may include only critical or essential network initialization information associated with the network initialization of the host device 202/300, and thus provide a relatively clear and summarized view of the network initialization operations performed by the host device 202/300 and the results of those network initialization operations.

For example, the network initialization communications performed by the host device 202/300 may include DHCP network initialization communications, and the filtering of those DHCP network initialization communications may include filtering out DHCP network initialization information such as information associated with how the DHCP server operates (e.g., how the DHCP server performs handshake operations, information about the DHCP server IP address, etc.) in order to provide filtered DHCP network initialization communications that include DHCP network initialization information such as information about a DHCP operation that was utilized to retrieve a valid IP address, the use of DHCP communications for IPv4, etc. As will be appreciated by one of skill in the art in possession of the present disclosure, the filtered DHCP network initialization communications discussed above include only DHCP network initialization information that is critical or essential to the network initialization of the host device 202/300 (while removing DHCP network initialization information that is non-critical or unessential to the network initialization of the host device 202/300), thus providing a clear/summarized view of the DHCP network initialization operations performed by the host device and the results of those DHCP network initialization operations.

In another example, the network initialization communications performed by the host device 202/300 may include PXE network initialization communications, and the filtering of those PXE network initialization communications may include filtering out PXE network initialization information in order to provide filtered DHCP network initialization communications that includes an IP address, a netmask, a gateway, DHCP boot options 60, 66, and 67, a confirmation of whether a connection was achieved with the PXE driver and a boot image was downloaded correctly, and/or other critical PXE network initialization information that would be apparent to one of skill in the art in possession of the present disclosure. As will be appreciated by one of skill in the art in possession of the present disclosure, the filtered PXE network initialization communications discussed above include only PXE network initialization information that is critical or essential to the network initialization of the host device 202/300 (while removing PXE network initialization information that is non-critical or unessential to the network initialization of the host device 202/300), thus providing a clear/summarized view of the PXE network initialization operations performed by the host device and the results of those PXE network initialization operations.

In another example, the network initialization communications performed by the host device 202/300 may include iSCSI network initialization communications, and the filtering of those iSCSI network initialization communications may include filtering out iSCSI network initialization information in order to provide filtered iSCSI network initialization communications that includes an IP address, a netmask, a gateway, DHCP boot options 17 and 43, a confirmation of whether authentication and a connection were achieved with an iSCSI target server, and/or other critical iSCSI network initialization information that would be apparent to one of skill in the art in possession of the present disclosure. As will be appreciated by one of skill in the art in possession of the present disclosure, the filtered iSCSI network initialization communications discussed above include only iSCSI network initialization information that is critical or essential to the network initialization of the host device 202/300 (while removing iSCSI network initialization information that is non-critical or unessential to the network initialization of the host device 202/300), thus providing a clear/summarized view of the iSCSI network initialization operations performed by the host device and the results of those iSCSI network initialization operations.

In another example, the network initialization communications performed by the host device 202/300 may include HTTP(S) network initialization communications, and the filtering of those HTTP(S) network initialization communications may include filtering out HTTP(S) network initialization information in order to provide filtered HTTP(S) network initialization communications that includes an IP address, a netmask, a gateway, particular DHCP boot options (e.g., "DHCP4_TAG_BOOTFILE_LEN (13)", "DHCP4_TAG_BOOTFILE (67)", and "DHCP4_TAG_DNS_SERVER (6)" for DHCPv4 options over for IPv4; "DHCP6_OPT_BOOT_FILE_URL (59)", "DHCP6_OPT_BOOT_FILE_PARAM (60)", and "DHCP6_OPT_DNS_SERVERS (23)" for DHCPv6 operations over IPv6), certificate validation logs, server authentication results, file download results, and/or other critical HTTP(S) network initialization information that would be apparent to one of skill in the art in possession of the present disclosure. As will be appreciated by one of skill in the art in possession of the present disclosure, the filtered HTTP(S) network initialization communications discussed above include only HTTP(S) network initialization information that is critical or essential to the network initialization of the host device 202/300 (while removing HTTP(S) network initialization information that is non-critical or unessential to the network initialization of the host device 202/300), thus providing a clear/summarized view of the HTTP(S) network initialization operations performed by the host device and the results of those HTTP(S) network initialization operations. As such, one of skill in the art in possession of the present disclosure will appreciate that, for different network initialization communications, different network initialization communication information may be filtered to provide the filtered network initialization communications that may then be quickly and easily checked by a user or support personnel and reduce the need for service engineers or development teams to identify network initialization communication issues.

As will be appreciated by one of skill in the art in possession of the present disclosure, the filter(s) used by the filtering sub-engine 306c may be provided by default filter(s) that may be defined by the provider of the host device 202/300, and/or may be configurable by a user of the host device 202/300 in order to define what network initialization information generated as part of the network initialization communications discussed above is stored during the method 400. As such, the network initialization communication storage engine 304 and/or the initialization engine 306 may be configured to receive one or more filtering rules and/or other filter information (e.g., from a user) and store those filtering rule(s) in the network initialization communication storage database 312, and then subsequently retrieve those filtering rule(s) from the network initialization communication storage database 312 and provide them to the filtering sub-engine 306c during initialization of the host device 202/300.

The method 400 then proceeds to block 408 where the initialization subsystem transmits the filtered network initialization communications for storage in a remote access controller device during the network initialization of the host device. For example, the storage of the filtered network initialization communications in the remote access controller device at block 408 may be performed before "ownership" of the host device 202/300 is transferred to an operating system boot loader, although the storage of the filtered network initialization communications in the remote access controller device at other times will fall within the scope of the present disclosure as well. In an embodiment, at block 408 and subsequent to generating the filtered network initialization communications at bock 406, the filtering sub-engine 306c may perform network initialization flow type retrieval operations 700 to retrieve a network initialization flow type from the boot management sub-engine 306b. As discussed above, the host device 300 may be configurable to perform network initialization using different network initialization flow types (e.g., the NVMe-oF network initialization flow type, the HTTP network initialization flow type, the iSCSI network initialization flow type, and the PXE network initialization flow type discussed above), and thus some embodiments of the method 400 may include the filtering sub-engine 306c identifying which of those network initialization flow types is being used during the generation of the network initialization communications via the boot management sub-engine 306b (e.g., the boot manager in the BIOS/UEFI may identify a currently selected boot option to the filtering sub-engine 306c).

Figure 8:
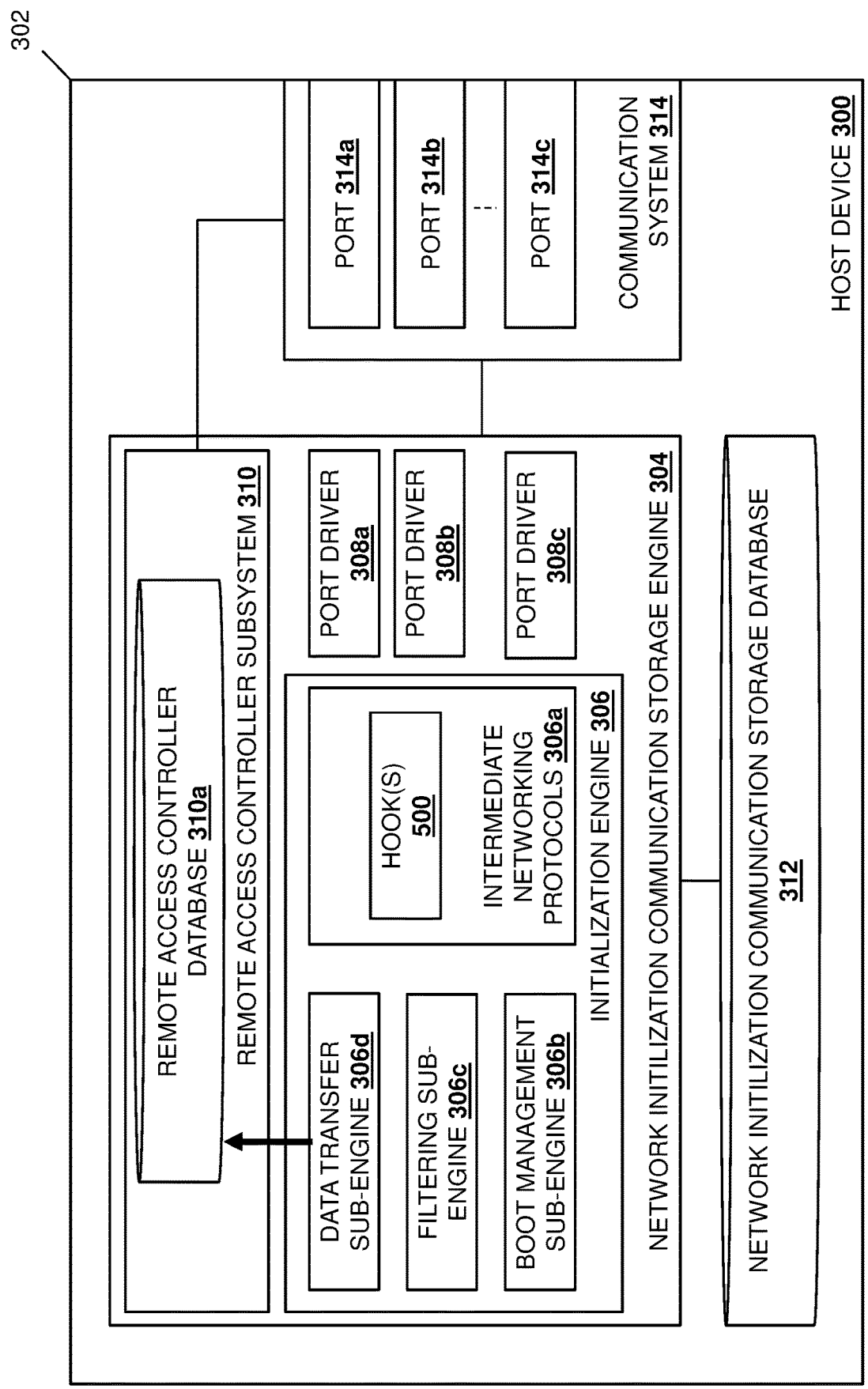
FIG. 8 is a schematic view illustrating an embodiment of the host device of FIG. 3 operating during the method of FIG. 4.
Figure 9A:
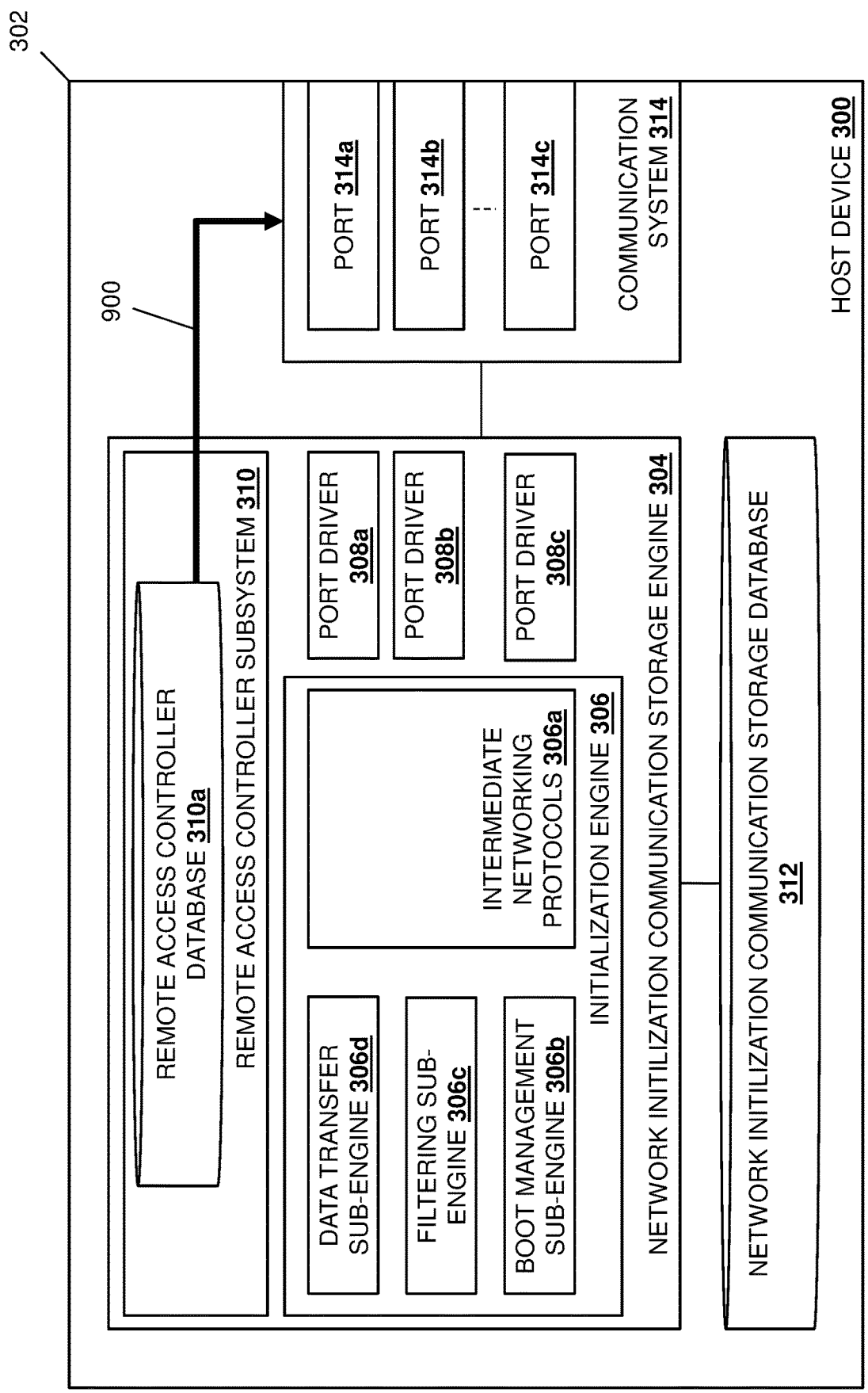
FIG. 9A is a schematic view illustrating an embodiment of the host device of FIG. 3 operating during the method of FIG. 4.

In an embodiment, at block 408 and subsequent to retrieving the network initialization flow type, the filtering sub-engine 306c may perform filtered network initialization communication storage provisioning operations 702 that include transmitting the filtered network initialization communications along with an identification of the network initialization flow type to the data transfer sub-engine 306d. With reference to FIG. 8, in response to receiving the filtered network initialization communications along with the identification of the network initialization flow type from the filtering sub-engine 306c, the data transfer sub-engine 306d may store those filtered network initialization communications in association with the identification of the network initialization flow type in the remote access controller database 310a included in the remote access controller subsystem 310. Continuing with the specific example discussed above, the data transfer sub-engine 306d may be provided by the "DellTelemetryLib" BIOS/UEFI functionality discussed above, and thus may provide for storage of the filtered network initialization communications in association with the identification of the network initialization flow type in a TSL in the remote access controller database 310a without the need for the BIOS/UEFI to be aware of its storage location in the remote access controller subsystem 310. However, while a specific storage technique for the storing filtered network initialization communications is described, one of skill in the art in possession of the present disclosure will recognize that the filtered network initialization communications of the present disclosure may be stored in other locations and in other manners (e.g., without associating those filtered network initialization communications with the identification of the network initialization flow type) while remaining within the scope of the present disclosure as well. As will be appreciated by one of skill in the art in possession of the present disclosure, the completion of the network initialization process and/or storage of the filtered network initialization communications may be followed by the boot management sub-engine 306b stopping the network initialization communication copying and copy forwarding operations performed by the drivers in the host device 202/300.

The method 400 may then proceed to optional block 412 where the remote access controller device may transmit the filtered network initialization communications to an initialization issue analysis system. As will be appreciated by one of skill in the art in possession of the present disclosure, in some embodiments the network initialization of the host device 202/300 may complete such that the host device 202/300 enters a runtime state (e.g., in which an operating system controls the operation of the host device 202/300), and thus the method 400 may end. However, in other embodiments, at optional block 412 the network initialization of the host device 202/300 may fail due to issues with the network initialization communications such as, for example, inability to communicate with a DCHP server, inability to communicate with a DNS server, inability to establish a TCP connection, data transfer errors, security issues (e.g., certificate or key issues with Transport Layer Security (TLS), handshake issues, security protocol issues, host device permission issues associated with the NVMe-oF storage system, host device namespace issues associated with the NVMe-oF storage system, etc.), and/or other network communication issues known in the art. In such situations, at optional block 412, the remote access controller subsystem 310 may retrieve the filtered network initialization communications generated during that failed network initialization and stored in the remote access controller database 310a, and perform filtered network initialization communication transmission operations 900 that include transmitting the filtered network initialization communications via the communication system 314 and through the network 204 to the initialization issue analysis system 206.

The method 400 may then proceed to optional block 414 where the initialization issue analysis system uses the filtered network initialization communications to identify issues with the network initialization of the host device. In an embodiment, at block 414a and in response to receiving the filtered network initialization communications, the initialization issue analysis system 206 may then perform any of a variety of initialization failure analysis operations known in the art (e.g., while in an operating system/runtime environment using applications like WIRESHARK open source software, TCPDUMP open source software, and/or other existing operating system network packet analysis tools) using those filtered network initialization communications in order to identify one or more issues that resulted in the failed network initialization for the host device 202/300. As will be appreciated by one of skill in the art in possession of the present disclosure, the filtered network initialization communications may be utilized by the initialization issue analysis system 206 to reproduce the issue(s) that resulted in the failed network initialization for the host device 202/300, and allows such reproduction operations to be performed quicker than is possible in conventional systems.

Two of the inventors of the present disclosure describe techniques for network initialization monitoring in U.S. patent application Ser. No. 17/511,771, filed on Oct. 27, 2021, the disclosure of which is incorporated by reference in its entirety. As will be appreciated by one of skill in the art in possession of the present disclosure, the functionality of the network initialization monitoring system discussed in that application may be may be combined with the network initialization communication filtering and storage functionality described herein in order to, for example, filter the network initialization communications generated by a host device during its initialization to provide filtered network initialization communications before providing those filtered network initialization communications via the network to a monitoring system.

Thus, systems and methods have been described that provide for the local storage of filtered network boot communications generated by a host device during network boot in a remote access controller device, which allows those filtered boot communications to be retrieved from the remote access controller device and analyzed in the event of a network boot failure with the host device. For example, a network boot communication storage system may include a host device coupled to a network-based storage system and a boot issue analysis system via a network. The host device includes a BIOS/UEFI boot subsystem coupled to each of a plurality of ports. During network boot of the host device via the network-based storage system, the BIOS/UEFI boot subsystem identifies network boot communications transmitted via the port(s) and the network, filters the network boot communications to remove a subset of network boot information and provide filtered network boot communications, and transmits the filtered network boot communications for storage in a remote access controller subsystem in the host device. In the event the network boot of the host device fails, the boot issue analysis system retrieves the filtered network boot communications from the remote access controller subsystem, and uses them to identify at least one issue with the network boot initialization of the host device via the network-based storage system. As such, some embodiments of the present disclosure may provide for "always-on" filtered network boot communication recording at the host device that may subsequently be used to identify network boot issues, which eliminates security concerns with conventional systems that have switches coupled to a host device store all of the network communications by that host device in order to analyze network communication issues with that host device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network initialization communication storage system, comprising:
    a storage system;
    an initialization issue analysis system; and
    a host device that is coupled to the storage system and the initialization issue analysis system via a network, wherein the host device includes:
        a plurality of ports;
        an initialization subsystem that is coupled to each of the plurality of ports and that is configured, during network initialization of the host device via the storage system, to:

identify network initialization communications that are transmitted via at least one of the plurality of ports and the network;

filter the network initialization communications to remove a subset of network initialization information from the network initialization communications to provide filtered network initialization communications; and transmit the filtered network initialization communications for storage; and a remote access controller subsystem that is coupled to the initialization subsystem and that is configured, during the network initialization of the host device via the storage system, to:

receive the filtered network initialization communications from the initialization subsystem; and store the filtered network initialization communications, wherein the filtered network initialization communications are configured for use by the initialization issue analysis system to identify at least one issue with the network initialization of the host device via the storage system.

2. The system of claim 1, wherein the remote access controller subsystem is configured to:

receive, from the initialization issue analysis system, a network initialization communication request;

retrieve, in response to receiving the network initialization communication request, the filtered network initialization communications; and transmit, to the network initialization issue analysis system, the filtered network initialization communications.

3. The system of claim 2, wherein the initialization issue analysis system is configured to:

identify, using the filtered network initialization communications, at least one issue with the network initialization of the host device via the storage system.

4. The system of claim 1, wherein the network initialization of the host device is performed using a first network initialization flow type included in a plurality of network initialization flow types available for network initialization of the host device, and wherein the filtered network initialization communications are stored in association with the first network initialization flow type.

5. The system of claim 4, wherein the plurality of network initialization flow types include at least two of:

a Non-Volatile Memory express over Fabrics (NVMe-oF) network initialization flow type, a HyperText Transfer Protocol (HTTP) network initialization flow type, an Internet Small Computer Systems Interface (ISCSI) network initialization flow type, and a Pre-eXecution Environment (PXE) network initialization flow type.

6. The system of claim 1, wherein the identifying the network initialization communications that are transmitted via the at least one of the plurality of ports and the network includes:

a plurality of networking protocol drivers in the initialization subsystem copying the network initialization communications that are transmitted via the at least one of the plurality of ports and the network, and forwarding the copies of the network initialization communications to a filtering subsystem in the initialization subsystem that filters the network initialization communications.

7. An Information Handling System (IHS), comprising:
an Information Handling System (IHS) processing system;

a IHS memory system that is coupled to the IHS processing system, and that includes instructions that, when executed by the IHS processing system, cause the IHS processing system to provide an initialization engine that is configured, during network initialization of an IHS via a storage system and through a network, to:

identify network initialization communications that are transmitted via the network and at least one of a plurality of ports that are coupled to the processing system;

filter the network initialization communications to remove a subset of network initialization information from the network initialization communications to provide filtered network initialization communications; and transmit the filtered network initialization communications for storage;

a remote access controller processing system that is coupled to the IHS processing system; and a remote access controller memory system that is coupled to the remote access controller processing system, and that includes instructions that, when executed by the remote access controller processing system, cause the remote access controller processing system to provide a remote access controller engine that is configured, during the network initialization of the IHS via the storage system and through the network, to:

receive the filtered network initialization communications from the initialization engine; and store the filtered network initialization communications, wherein the filtered network initialization communications are configured for use by a initialization issue analysis system to identify at least one issue with the network initialization of the IHS via the storage system.

8. The IHS of claim 7, wherein
the remote access controller engine is configured to:

receive, from an initialization issue analysis system, a network initialization communication request; and transmit, to the network initialization issue analysis system in response to receiving the network initialization communication request, the filtered network initialization communications.

9. The IHS of claim 7, wherein the network initialization of the IHS is performed using a first network initialization flow type included in a plurality of network initialization flow types available for network initialization of the host device, and wherein the filtered network initialization communications are stored in association with the first network initialization flow type.

10. The IHS of claim 9, wherein the plurality of network initialization flow types include at least two of:

a Non-Volatile Memory express over Fabrics (NVMe-oF) network initialization flow type, a HyperText Transfer Protocol (HTTP) network initialization flow type, an Internet Small Computer Systems Interface (ISCSI) network initialization flow type, and a Pre-eXecution Environment (PXE) network initialization flow type.

11. The IHS of claim 7, wherein the identifying the network initialization communications that are transmitted via the at least one of the plurality of ports and the network includes:

a plurality of networking protocol drivers in the initialization engine copying the network initialization communications that are transmitted via the at least one of the plurality of ports and the network, and forwarding the copies of the network initialization communications to a filtering sub-engine in the initialization engine that filters the network initialization communications.

12. The IHS of claim 11, wherein the initialization engine is configured, during the network initialization of the IHS via the storage system, to:
provide a respective hook in each of the plurality of networking protocol drivers in the initialization engine, wherein each hook is configured to:
copy the network initialization communications that are transmitted via the at least one of the plurality of ports and the network; and
forward the copies of the network initialization communications to the filtering sub-engine in the initialization engine.

13. The IHS of claim 7, where
the remote access controller engine is configured to:
determine that an issue has occurred with the network initialization of the host device via the storage system that has prevented the host device from initializing; and
automatically transmit, to a network initialization issue analysis system without any instruction from a user and in response to determining that the issue has occurred with the network initialization of the host device via the storage system that has prevented the host device from initializing, the filtered network initialization communications.

14. A method for storing network initialization communications, comprising:
identifying, by an initialization subsystem in a host device during network initialization of the host device via a storage system and through a network, network initialization communications that are transmitted via the network and at least one of a plurality of ports included on the host device;
filtering, by the initialization subsystem during the network initialization of the host device via the storage system and through the network, the network initialization communications to remove a subset of network initialization information from the network initialization communications to provide filtered network initialization communications;
transmitting, by the initialization subsystem during the network initialization of the host device via the storage system and through the network, the filtered network initialization communications for storage;
receiving, by a remote access controller device in the host device during the network initialization of the host device via the storage system and through the network, the filtered network initialization communications from the initialization subsystem; and
storing, by the remote access controller device during the network initialization of the host device via the storage system and through the network, the filtered network initialization communications, wherein the filtered network initialization communications are configured for use by an initialization issue analysis system to identify at least one issue with the network initialization of the host device via the storage system.

15. The method of claim 14, further comprising:
receiving, by the remote access controller device from an initialization issue analysis system, a network initialization communication request; and
transmitting, by the remote access controller device to the network initialization issue analysis system in response to receiving the network initialization communication request, the filtered network initialization communications.

16. The method of claim 15, further comprising:
identifying, by the network initialization issue analysis system using the filtered network initialization communications, at least one issue with the network initialization of the host device via the storage system.

17. The method of claim 14, wherein the network initialization of the host device is performed using a first network initialization flow type included in a plurality of network initialization flow types available for network initialization of the host device, and wherein the filtered network initialization communications are stored in association with the first network initialization flow type.

18. The method of claim 17, wherein the plurality of network initialization flow types include at least two of:
a Non-Volatile Memory express over Fabrics (NVMe-oF) network initialization flow type, a HyperText Transfer Protocol (HTTP) network initialization flow type, an Internet Small Computer Systems Interface (ISCSI) network initialization flow type, and a Pre-eXecution Environment (PXE) network initialization flow type.

19. The method of claim 14, wherein the identifying the network initialization communications that are transmitted via the at least one of the plurality of ports and the network includes:
copying, by a plurality of networking protocol drivers in the initialization subsystem, the network initialization communications that are transmitted via the at least one of the plurality of ports and the network; and
forwarding, by the plurality of networking protocol drivers in the initialization subsystem, the copies of the network initialization communications to a filtering subsystem in the initialization subsystem that filters the network initialization communications.

20. The method of claim 19, further comprising:
providing, by the initialization subsystem during the network initialization of the host device via the storage system and through the network, a respective hook in each of the plurality of networking protocol drivers in the initialization subsystem;
copying, using each respective hook in its respective networking protocol driver, the network initialization communications that are transmitted via the at least one of the plurality of ports and the network; and
forwarding, using each respective hook in its respective networking protocol driver, the copies of the network initialization communications to the filtering sub-engine in the initialization engine.

* * * * *